US005353360A

United States Patent [19]

Obara

[11] Patent Number: 5,353,360

[45] Date of Patent: Oct. 4, 1994

[54] COMPACT OPTICAL CHARACTER READING APPARATUS HAVING MULTIPLE PIVOTING PARTS

[75] Inventor: Tadashi Obara, Tokyo, Japan

[73] Assignee: Kabushiki Kaisha Toshiba, Kawasaki, Japan

[21] Appl. No.: 791,325

[22] Filed: Nov. 14, 1991

[30] Foreign Application Priority Data

Nov. 16, 1990 [JP] Japan .................................. 2-308480
Nov. 16, 1990 [JP] Japan .................................. 2-308481

[51] Int. Cl.[5] .......................... G06K 9/00; B41J 3/36; B41J 29/13

[52] U.S. Cl. ...................................... 382/65; 358/496; 400/88; 400/693; 346/145

[58] Field of Search .................... 382/65, 59; 358/400, 358/476, 496, 498, 474, 473, 497; 271/3.1, 4, 145; 400/689, 690.4, 691, 692, 693, 88; 346/145; 364/708.1; D18/49; D14/105, 106, 116, 118

[56] References Cited

U.S. PATENT DOCUMENTS

| | | | |
|---|---|---|---|
| 4,546,947 | 10/1985 | Gesten | 248/442.2 |
| 4,754,337 | 6/1988 | Nohtomi et al. | 358/498 |
| 4,833,547 | 5/1989 | Mase | 358/400 |
| 4,835,619 | 5/1989 | Kobori et al. | 358/294 |
| 4,839,837 | 10/1987 | Chang | 364/708.1 |
| 4,895,288 | 1/1990 | Kotani et al. | 358/498 |
| 5,054,104 | 10/1991 | Yamaguchi | 382/59 |
| 5,115,374 | 5/1992 | Hongoh | 358/400 |
| 5,126,855 | 6/1992 | Saito | 358/496 |
| 5,229,869 | 7/1993 | Kikuchi et al. | 358/496 |

FOREIGN PATENT DOCUMENTS

| | | | |
|---|---|---|---|
| 60-73880 | 4/1985 | Japan | 400/689 |

OTHER PUBLICATIONS

Canon–Bubble Jet Printer Advertisement July 22, 1991.

*Primary Examiner*—Leo H. Boudreau
*Assistant Examiner*—Larry J. Prikockis
*Attorney, Agent, or Firm*—Finnegan, Henderson, Farabow, Garrett & Dunner

[57] ABSTRACT

In the optical character reading apparatus having an upper unit, lower unit, and discharge unit, the upper unit and discharge unit are swingably connected to the lower unit at its pivot. In case where paper jamming or the like occurs during a read operation, the upper unit is swung to expose the conveying path. In transportation of the apparatus, the discharge unit is swung to cover the upper unit. Further, desired characters and the like are printed on the processed documents to easily classify them.

6 Claims, 7 Drawing Sheets

COMPACT OPTICAL CHARACTER READING APPARATUS HAVING MULTIPLE PIVOTING PARTS

BACKGROUND OF THE INVENTION

1. Field of the Invention

The present invention relates to an optical character reading apparatus.

2. Description of the Related Art

Optical character reading system for reading out images such as characters, recorded on an object such as a document, generally includes a scanner apparatus for detecting document images by optically scanning the document, a character recognition apparatus for executing a character recognition process based on the document image detected by the scanner apparatus, and a control apparatus for controlling the recognition process and the like, and operation of the whole optical character reading system.

FIGS. 1 and 2 are block diagrams illustrating an arrangement of a conventional optical character reading system. As can be seen from FIG. 1, each of a scanner apparatus 1, a character recognition apparatus 2, and a control apparatus 3 is housed in a respective body, and these apparatuses are connected via interfaces thereof by GPIB (general purpose interface bus) cables, or the like. To the control apparatus 3, further connected are peripheral circuits such as a CRT (cathode ray tube) display 4, a keyboard 5, a floppy disk drive (FDD) 6, etc. In FIG. 2, each of a scanner apparatus 1, and character recognition apparatus 2, similar to those of FIG. 1, is housed in a respective body, and a personal computer 7 is provided in place of the control apparatus 3 shown in FIG. 1.

As described above, the conventional optical character reading system include at least three independent bodies. As a result, the conventional system occupies a large area on a floor where it is placed. Further, in order to move the system from place to place, it must be separated into independent bodies. Therefore, when the system is set up in a new place, the independent bodies must be connected again by the cables.

Thus, there has been a great demand for an optical character reading system which is compact, easily transportable, and capable of providing efficient classification, etc., of documents that have been read.

SUMMARY OF THE INVENTION

The object of the present invention is to provide a compact optical character reading apparatus.

According to the invention, there is provided an optical character reading apparatus comprising a lower unit including first storage means for storing an object, and moving means for moving the object along a conveying path, and an upper unit including discharge means for discharging the object from the conveying path after completion of a read-out operation, and second storage means for storing the object discharged from the discharge means, wherein the upper unit and the discharge unit are swingably fixed to the lower unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The following are explanations of embodiments of the present invention with reference to accompanying drawings.

Figure 1:
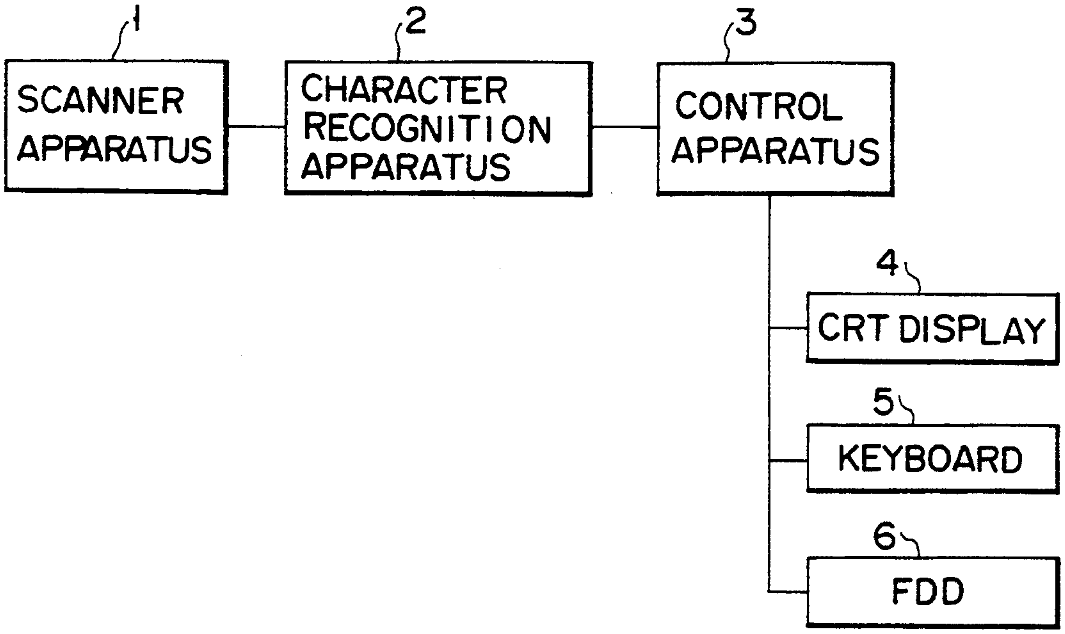
(PRIOR ART) FIG. 1
FIGS. 1 and 2 are block diagrams of conventional optical reading apparatuses.
Figure 2:
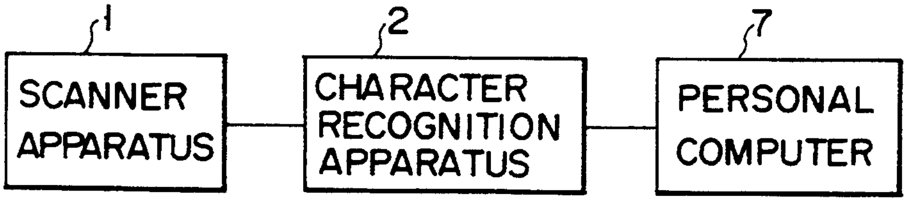
(PRIOR ART) FIG. 2
Figure 3:
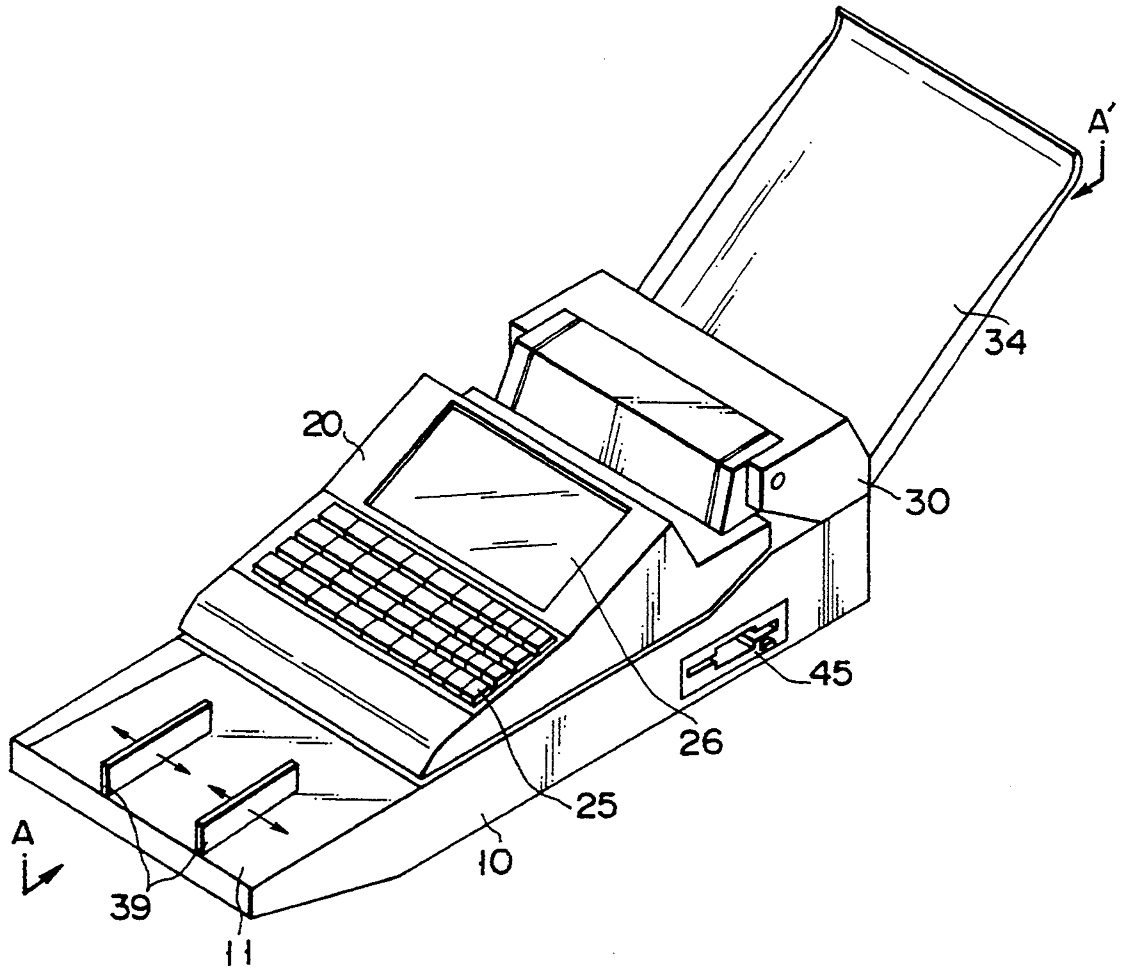
FIG. 3 is perspective view of an optical character reading apparatus according to a first embodiment of the present invention.
Figure 4:
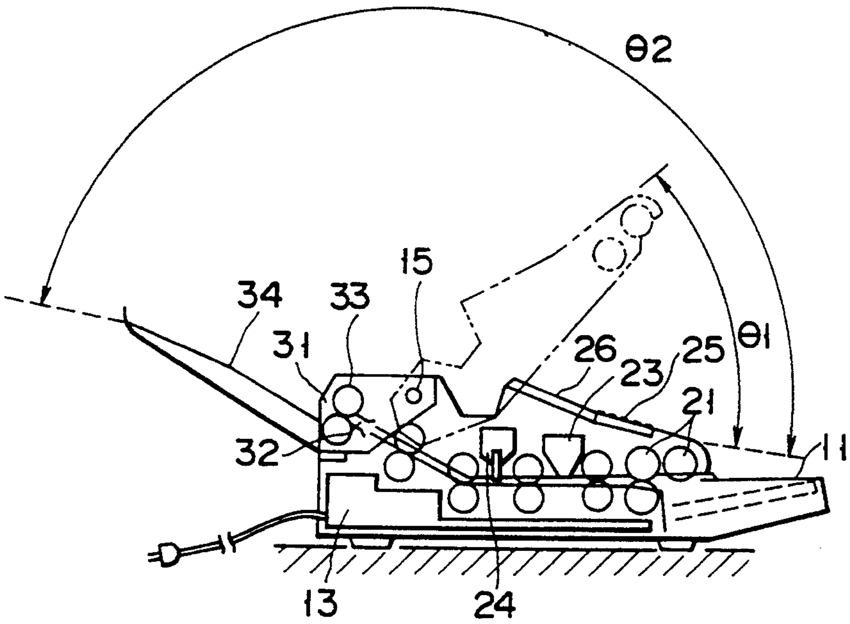
FIG. 4 is a sectional view of the optical character reading apparatus shown in FIG. 3.
Figure 5A:
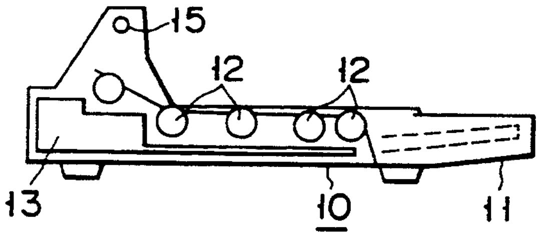
FIGS. 5A to 5C are a individual side views of each of the units included in the apparatus shown in FIG. 4, respectively.
Figure 5B:
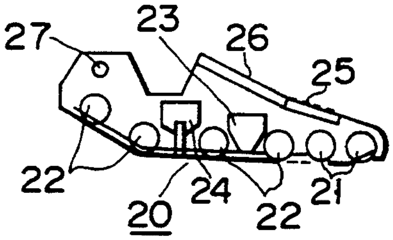
Figure 5C:
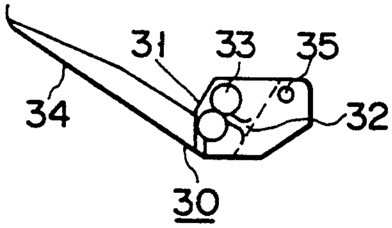
Figure 6:
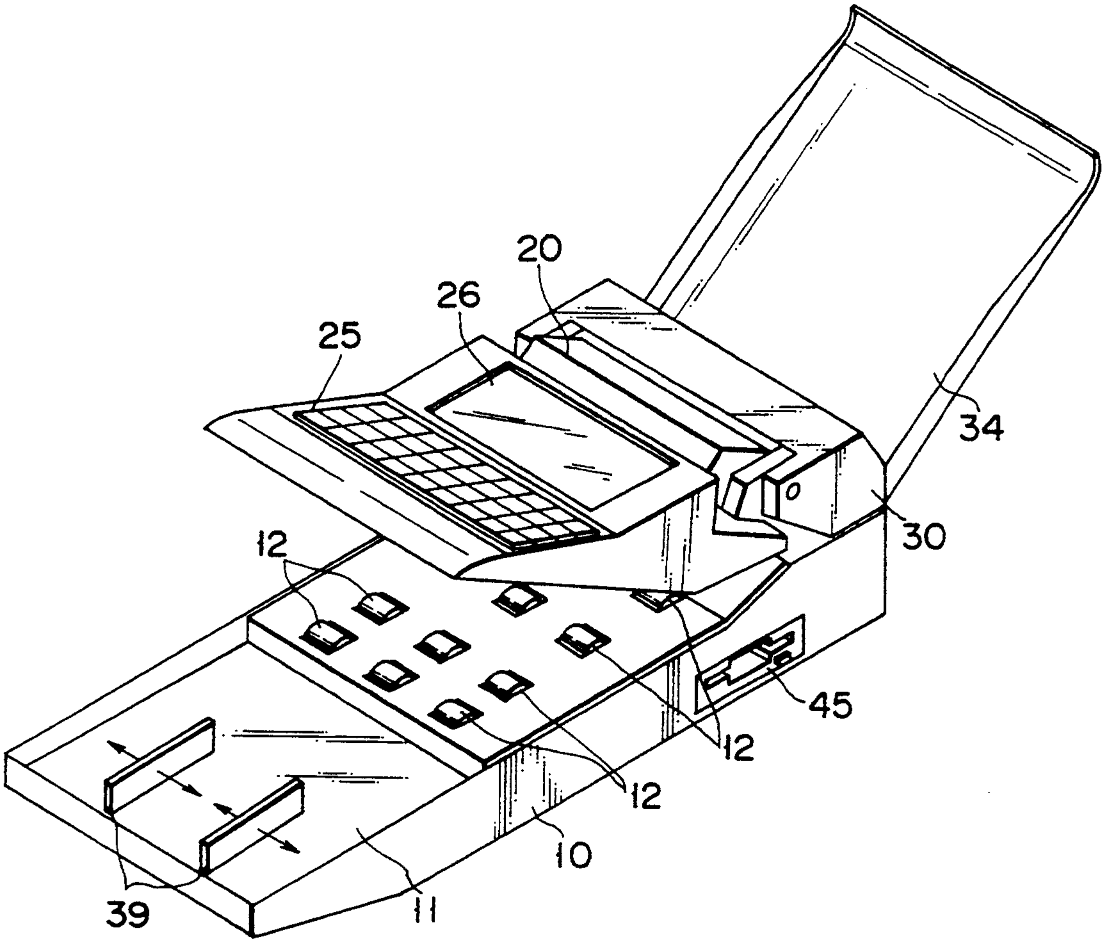
FIG. 6 is a perspective view of the apparatus shown in FIG. 3 in the state that the upper unit is swung open to expose a conveying path.
Figure 7:
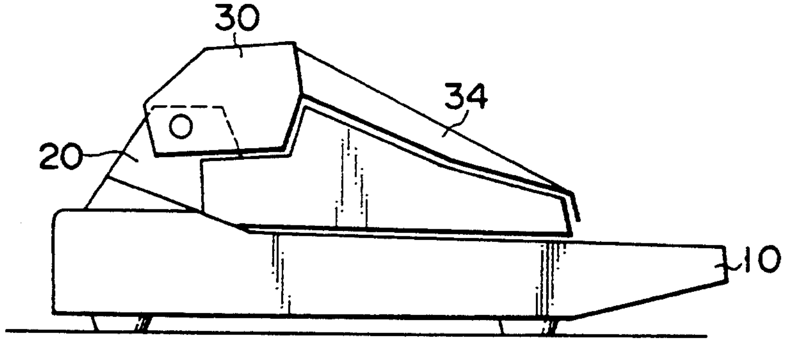
FIG. 7 is a side view of the apparatus shown in FIG. 3 in the state that the stack table is swung to cover the upper unit.

FIG. 3 is a perspective view of an optical character reading apparatus according to the first embodiment of the present invention. FIG. 4 is a sectional view taken along the line A—A' of the apparatus shown in FIG. 3. Each of FIGS. 5A to 5C are side views of each of the units of the apparatus shown in FIG. 3. FIG. 6 is a perspective view of the apparatus shown in FIG. 3 in the state that the upper unit is swung out to expose a conveying path. FIG. 7 is a side view of the apparatus shown in FIG. 3 in the state that a stack table is swung to cover the upper unit.

The optical character reading apparatus of the first embodiment comprises a lower unit 10 (see FIG. 5A), a upper unit 20 (FIG. 5B), and a discharge unit 30 (FIG. 5C).

The lower unit 10, as shown in FIG. 5A, includes a hopper 11, a plurality of drive rollers 12, a process control section 13, a pivot 15, and guides 39 (see FIG. 3). The hopper 11 is provided for stacking documents, etc., to be read. The drive rollers 12 rotate to convey a document placed on the conveying path. The process control section 13 carries out operations such as control of the entire apparatus, and recognition of characters, etc., as explained later. The pivot 15 is arranged on the upper part of the lower unit 10 to pivotally mount upper unit 20 and discharge unit 30. With the above-described structure, the conveying path on which documents are moved is located between the upper surface of the lower unit 10 and the lower surface of the upper unit 20. Meanwhile, in accordance with the size of documents, the guides 39 can be slid in the directions indicated by the arrows in FIG. 3.

The upper unit 20, as shown in FIG. 5B, includes a plurality of feed rollers 21, a plurality of coupled moving rollers 22, a scanner 23, and a print head 24. The feed rollers 21 rotate to transfer documents stacked on the hopper 11, one by one along the conveying path. When the upper unit 20 is swung away from the lower unit 10, as shown in FIG. 6, the feed rollers 21 do not rotate. The coupled moving rollers 22 are provided according to the drive rollers 12 of the lower unit 10, and are rotated in accordance with rotation of the drive rollers 12. In other words, the coupled moving rollers do not rotate unless driven by rollers 12. The scanner 23 is arranged to face the conveying path, and reads out images on a document. The scanner 23 is, for example, an attach-type image sensor. The print head 24 is also arranged to face the conveying path to print characters, symbols, etc. on a document. The print head 24 is a small head, and can move in the directions perpendicular to the document conveying direction.

Further, the upper unit 20 has a keyboard 25, an LCD (liquid crystal display) 26, and a pivot 27. The keyboard 25 and LCD 26 are is used as an operation panel. Instructions, etc., necessary for reading out characters, entered by the keyboard 25 to the optical character reading apparatus. The LCD 26 displays the contents of the character reading process, as well as the results of the process. The pivot 27 is connected to the pivot 15 of the lower unit 10 such that the upper unit 20 can swing relative to the lower unit.

The discharge unit 30 includes a discharge opening 31, a conveying guide 32, a discharge roller 33, a stack table 34, and a pivot 35. The discharge opening 31 is designed for discharging documents from the conveying path. The conveying guide 32 guides these documents to the discharge opening 31. The discharge roller 33 rotates to discharge these document through the discharge opening 31. The stack table 34 stacks the documents discharged by the roller 33. The pivot 35 is connected to the pivot 15 of the lower unit 10 such that the discharge unit 30 can also swing relative to the lower unit.

Figure 8:
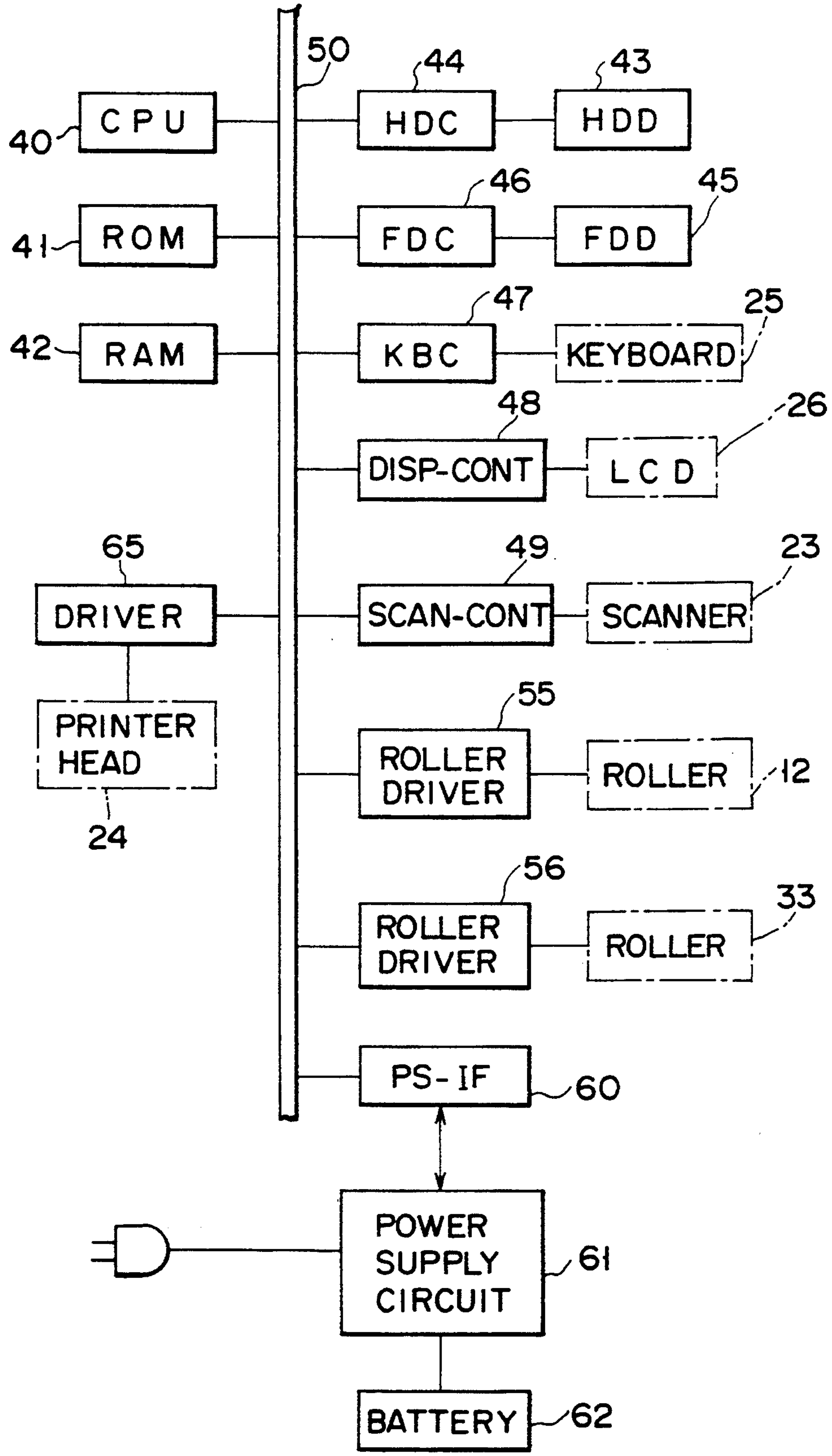
FIG. 8 is a block diagram describing the constitution of the process control section of the apparatus shown in FIG. 3.

FIG. 8 is a block figure showing the construction of the process control section 13 of the optical character reading apparatus shown in FIG. 3. In FIG. 8, the process control section 13 includes a central processing unit (CPU) 40 for controlling the entire apparatus, a read only memory (ROM) 41 for storing a control program, etc., a random access memory (RAM) 42, a hard disk drive (HDD) 43, a hard disk drive controller (HDC) 44 for controlling the HDD 43, a floppy disk drive (FDD) 45, and a floppy disk drive controller (FDC) 46 for controlling the FDD 45. The hard disk of the hard disk drive 43, or the floppy disk of the floppy disk drive 45 stores an image process program, character recognition process program, dictionary data, etc.

Further, the process control section 13 includes a keyboard controller (KBC) 47 for controlling key inputs from the keyboard 25, a display controller (DISP-CONT) 48 for controlling the display of the LCD 26, a scanner controller (SCAN-CONT) 49 for controlling the scanner 23, a connecting bus 50, a roller driver 55 for driving the rollers 12, a roller driver 56 for driving the roller 33, and a driver 65 for driving the print head 24.

Furthermore, the process control section 13 includes a power source interface (PS-IF) 60, a power source circuit 61, and a battery 62. The power source circuit 61 supplies a voltage to each component.

The operation of the optical character reading apparatus of the first embodiment will be now explained.

Documents to be character-read are stacked on the hopper 11. When the power is turned on, and voltages are supplied from the power source circuit 61 to the components, menu data concerning the character reading process is displayed on the LCD 26, and then necessary data for the character reading process is input to the apparatus by an operator using the keyboard 25. Upon reception of the data, the process control section 13 starts the character reading process. When the character reading process is started, documents stacked on the hopper 11 are guided one by one onto the conveying path by the drive rollers 12. A document guided onto the conveying path is transferred using the drive rollers 12 rotating in the predetermined direction and the coupled moving rollers 22 rotated by coupling with the drive rollers 12. During conveyance of the document, the scanner 23 reads out the image data on the document.

The image data read out by the scanner 23 is character-recognition-processed by the process control section 13 of the lower unit 10.

The document scanned by the scanner 23 is transferred to the discharge unit 30. On the conveying path between the scanner 23 and the discharge opening 32, the print head 24 is capable of printing characters, symbols, etc. on a document, based on the results of the character reading process. For example, a number indicating the order of the steps in the process, a symbol indicating whether or not characters were properly read out, a character indicating whether or not it is a rejected document, a symbol indicating the type of the document, etc. are printed. The document is guided to the discharge opening 31 from the conveying path between the lower unit 10 and upper unit 20 by the discharge guide 32 of the discharge unit 30, and is discharged from the discharge opening 31. The discharged document is stacked on the stack table 34.

As described, in the optical character reading apparatus of the first embodiment, the upper unit 20 and discharge unit 30 are swingably connected to the lower unit 10 at their respective pivots. When the apparatus is operating, the units are arranged as shown in FIG. 3. According to the arrangement, key input can be performed by the keyboard 25 located on the upper surface of the upper unit 20. The stack table 34 of the discharge unit 30 can stack discharged documents.

In the case where trouble such as paper jamming occurs on the conveying path during an operation of the apparatus, the upper unit 20 can be swung up to the position indicated by the double-dashed chain line shown in FIG. 4 about the pivot 15 of the lower unit 10. As a result, the upper unit 20 is raised up to the indicated position as shown in FIG. 6. The swingable angle $\theta 1$ of the upper unit 20 is, for example, 45° . Thus, the upper unit 20 can be swung to expose the conveying path. Therefore, maintenance of the apparatus can be easily conducted.

In the case where the whole apparatus is transported from the current set position to the other set position, the discharge unit 30 is swung about the pivot 15 of the lower unit 10, as shown in FIG. 7. The swingable angle $\theta 2$ (FIG. 4) of the discharge unit 30 is larger than angle $\theta 1$, for example, 120° . When the discharge unit 30 is swung down, it overlies the upper unit 20, and the stack table 34 covers the keyboard 25 and the LCD 26. Thus, the apparatus can be folded into a compact size to be easily transported. Further, since the keyboard 25 and the LCD 26 are covered by the stack table 34, damages to the apparatus, caused by external forces, or the like, can be prevented.

The character-reading-processed documents are stacked on the stack table 34. Since printing is executed by the print head 24 in accordance with the result of the process, the type of document, and the like, classification of the documents can be easily performed with reference to the printing results.

The following is an explanation of the second embodiment of the present invention.

Figure 9:
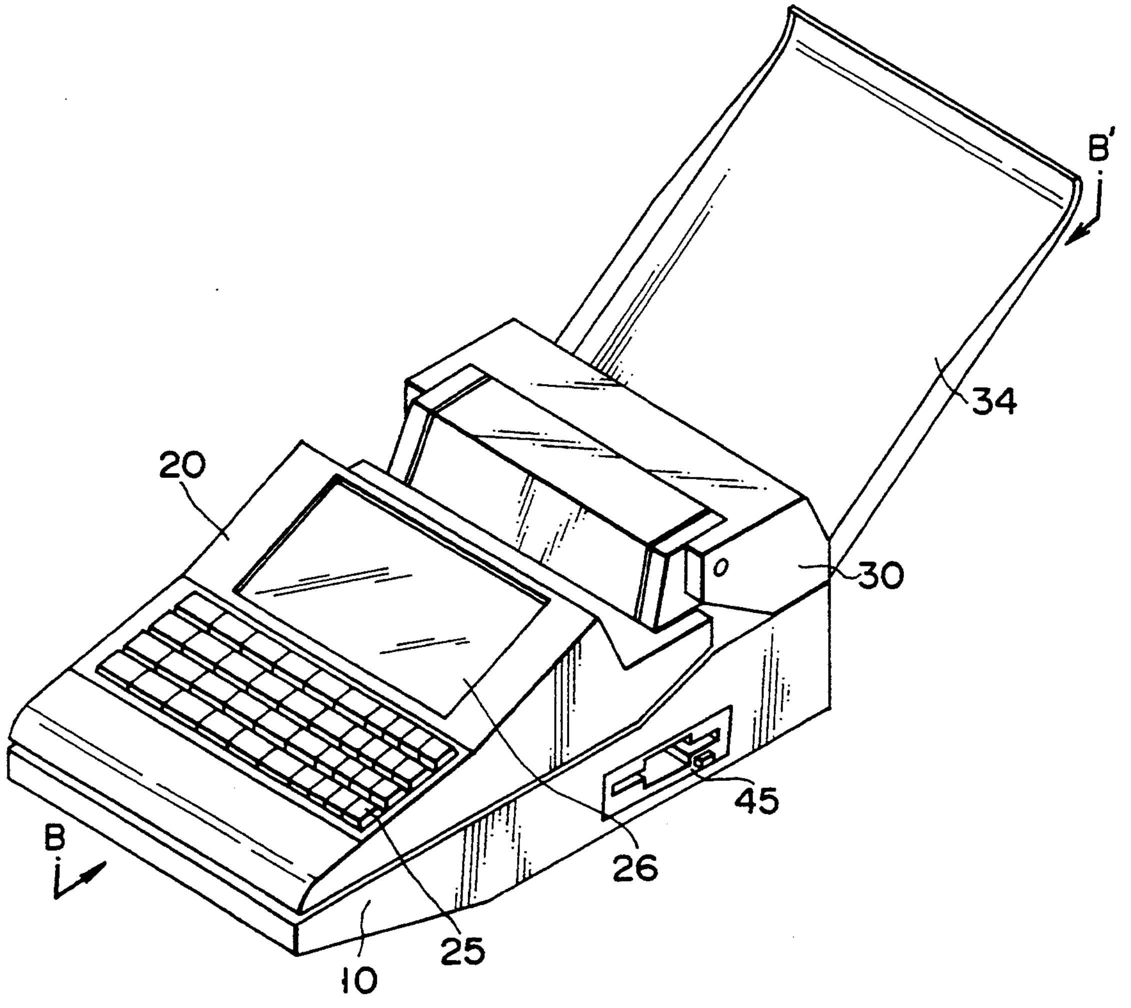
FIG. 9 is a perspective view of an optical character reading apparatus according to the second embodiment of the present invention.
Figure 10:
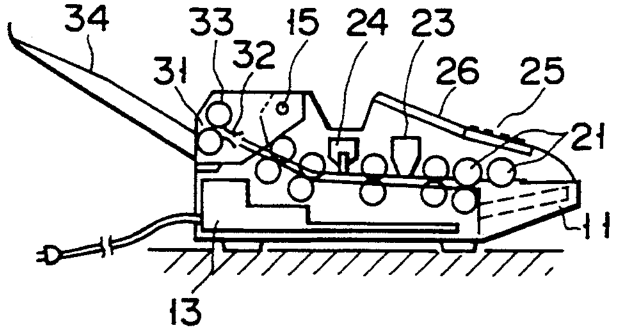
FIG. 10 is a sectional view of the apparatus shown in FIG. 9.
Figure 11:
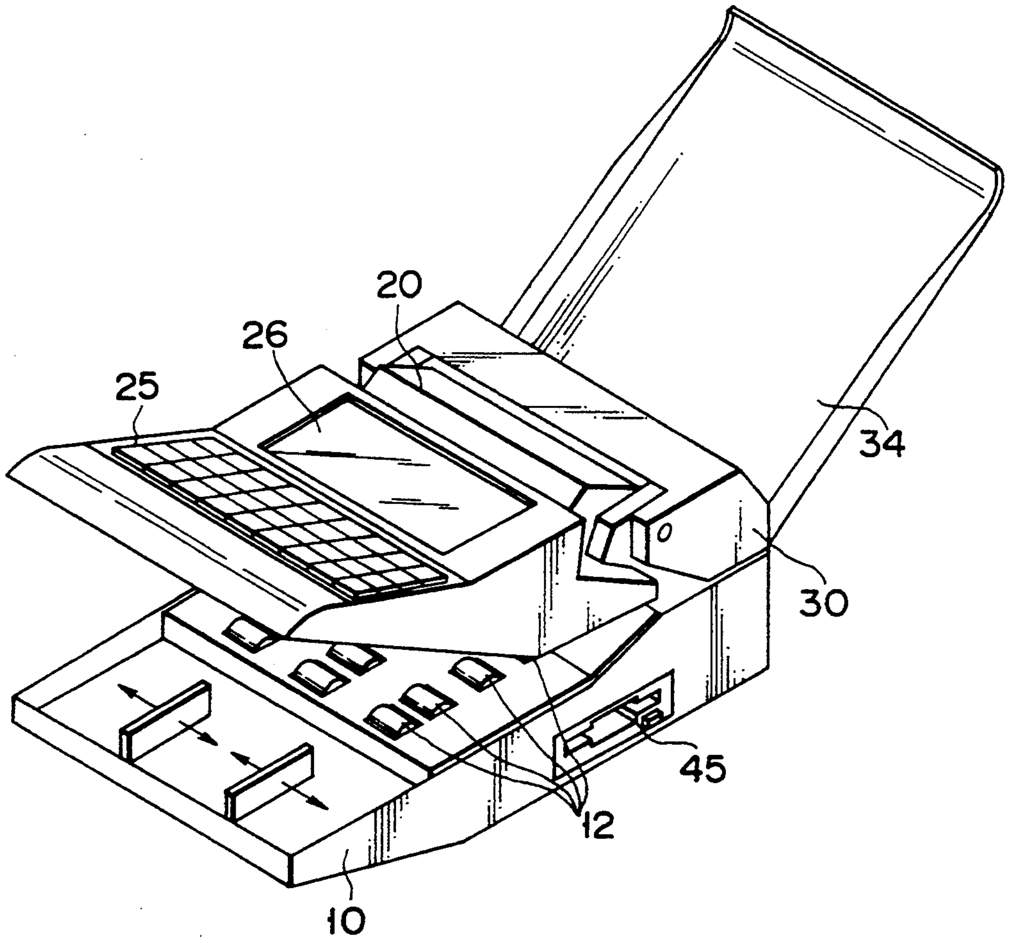
FIG. 11 is a perspective view of the apparatus shown in FIG. 9 in the state that the upper unit is swung to expose the conveying path.

FIG. 9 is a perspective view of an optical character reading apparatus according to the second embodiment of the invention. FIG. 10 is a sectional view of the optical character reading apparatus shown in FIG. 9, taken along the line B—B'. FIG. 11 is a perspective view of the optical character reading apparatus shown in FIG. 9 in the case where the upper unit is swung up to expose the conveying path.

Basically, the optical character reading apparatus of the second embodiment has a structure similar to that of the first embodiment except that the document input hopper 11 is covered by the upper unit 20, as seen in FIG. 10, and thus the size of the entire apparatus is smaller than that of the first embodiment.

According to the present invention, since the upper unit 20 and the discharge unit 30 are provided in overlying relation with the lower unit 10, the area occupied by the present apparatus is much less than that of the conventional apparatus. By reducing the size of the apparatus, transportation of the apparatus can be easily carried out. Further, since desired characters can be printed on the processed documents by the print head 24, classification of the documents is very easily performed.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An image processing apparatus having means for reading objects, comprising:

- an upper unit including display means for displaying data and input means for inputting data;
- a lower unit including an input table for stacking the objects to be read;
- a protective cover for protecting at least the display means and the input means when the protective cover is in a closed position and for stacking the objects after having been read when the protective cover is in an open position;
- a conveying path formed between the upper unit and the lower unit when the lower unit is covered by the upper unit; and
- a common axis on which the upper unit, the lower unit and the protective cover are coaxially pivotable.

2. The apparatus according to claim 1, wherein the input table is always exposed.

3. The apparatus according to claim 1, wherein, when the upper unit covers the lower unit, the input table is hidden from view.

4. The apparatus according to claim 1, wherein the input means and the input table are located at a front portion of the apparatus; the lower unit, the upper unit and the protective cover are coaxially pivoted at a rear portion of the apparatus; and the upper unit is pivotable in a direction such that the display means and the input means face an operator.

5. The apparatus according to claim 1, wherein at least one of the upper unit and the lower unit includes object reading means and means for printing predetermined data on the objects in response to the reading means.

6. The apparatus according to claim 1, wherein at least one of the upper unit and the lower unit includes means for printing predetermined data on the objects during conveyance along the conveying path.

* * * * *